Sept. 14, 1948.　　　　W. H. BAHAN　　　　2,449,157

DRIVING MEANS FOR LOOMS

Filed Nov. 28, 1947　　　　　　　　　　　　3 Sheets-Sheet 1

Inventor
WILLIAM H. BAHAN
By Paul Eaton
Attorney

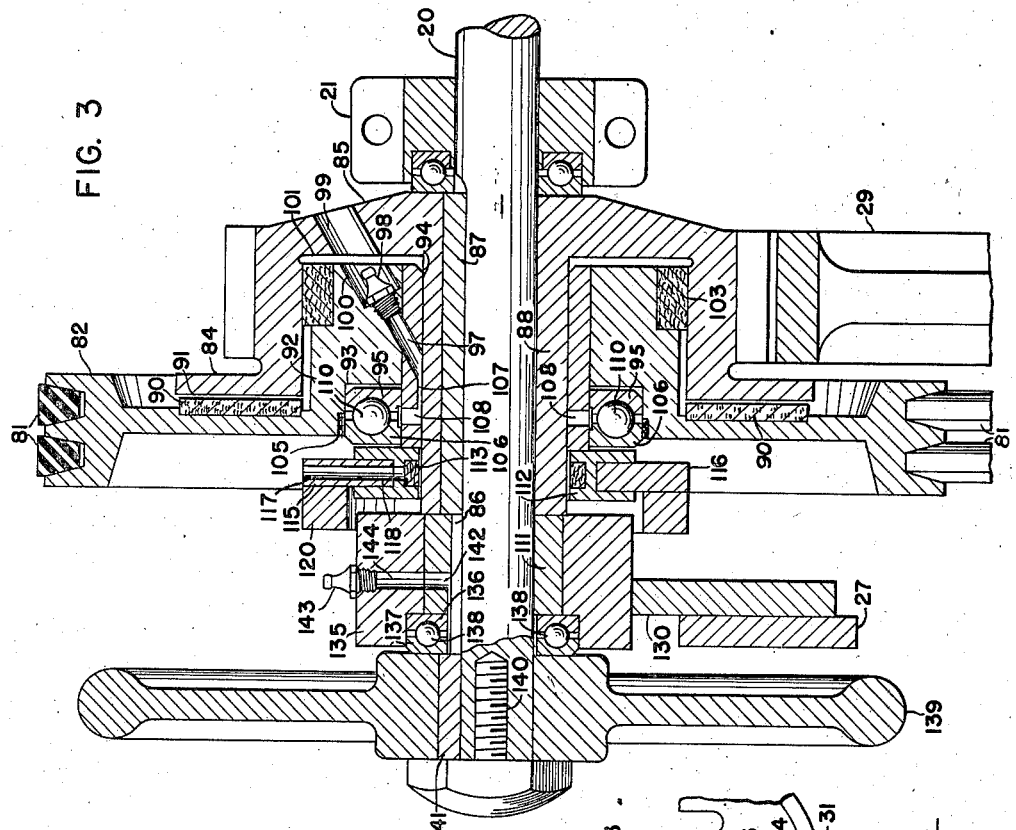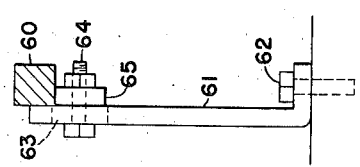

Sept. 14, 1948.    W. H. BAHAN    2,449,157
DRIVING MEANS FOR LOOMS

Filed Nov. 28, 1947    3 Sheets-Sheet 3

Inventor
WILLIAM H. BAHAN

Patented Sept. 14, 1948

2,449,157

UNITED STATES PATENT OFFICE 2,449,157

DRIVING MEANS FOR LOOMS

William H. Bahan, Greenville, S. C.

Application November 28, 1947, Serial No. 788,751

6 Claims. (Cl. 139—1)

This invention relates to an improved drive for looms and more especially to a means for mounting a suitable driving motor and having an idler shaft driven by the motor with a pulley thereon which in turn has another pulley integral therewith which is connected by a belt to a pulley loosely mounted on the crank shaft of the loom with a geared connection between the crank shaft of the loom and the cam shaft of the loom whereby all parts are driven in unison together with improved clutch means mounted on the cam shaft which are connected to the shipper rod so that when the shipper lever is actuated to stop the loom, the shipper rod will move the clutch to open position.

It is another object of this invention to provide an improved drive for looms, said loom having a crank shaft and a cam shaft, and an idler shaft with a geared connection between the cam shaft and the crank shaft and a motor drive having a connection with an idler pulley and said idler pulley also having connection with a pulley mounted on a clutch mechanism disposed on the crank shaft and a connection between the clutch mechanism and the shipper rod of the loom so that when the shipper lever is moved to off position, the clutch will be disengaged.

Some of the objects of the invention having been stated, other objects will appear as the description proceeds when taken in connection with the accompanying drawings, in which Figure 1 is an end view of the loom showing the improved drive and clutch mechanism associated therewith;

Figure 3 is a vertical sectional view taken substantially along the line 3—3 in Figure 1;

Figure 5 is a view taken along the line 5—5 in Figure 1 and showing portions of the loom frame broken away for sake of clearness;

Figure 6 is an elevation, partly in section, and taken along the line 6—6 in Figure 1;

Figure 1:
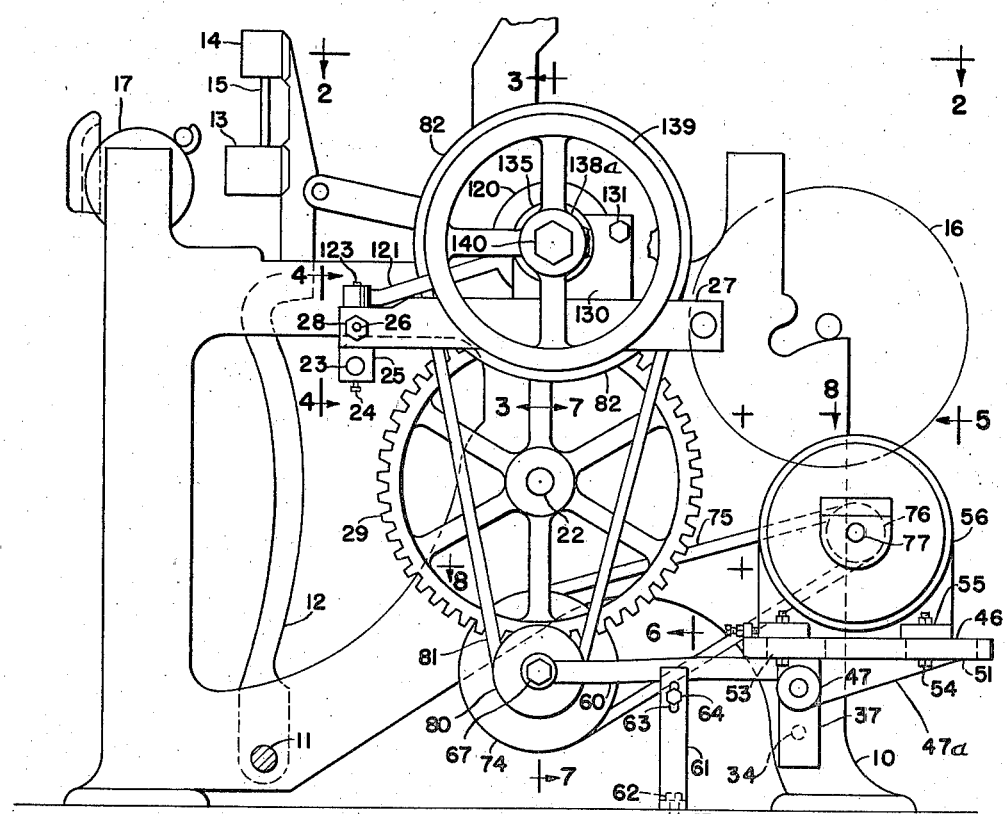

Referring more specifically to the drawings, the numeral 10 indicates one of the side frames of a loom which has oscillatably mounted therein a rocker shaft 11 which has swords 12 mounted thereon and which have secured thereto a suitable lay 13, reed cap 14, for holding a reed 15. The loom is also equipped with means for receiving a warp roll 16 and has a sand roll 17. The loom also has a crank shaft 20 mounted in suitable bearings 21, a portion of which is shown mounted on the upper portions of the side frames of the loom.

The loom also has a cam shaft 22 on which a gear 29 is fixed. The shaft 22 is mounted in a split bearing 30 whose upper half is secured to the lower half by screws 38. There is a shipper rod 23 slidably mounted in the side frames of the loom and this is connected in a conventional manner to the shipper rod lever of the loom, not shown, whereby it is moved to the position shown in Figure 4 when the loom is stopped. The shipper rod 23 has fixed thereon by a set screw 24, a collar 25 which has legs 25a and 25b slidably mounted on a bolt 26 fixedly secured in the side frame 10 of the loom and projecting outwardly and being also secured in a bar 27. The bar 27 is secured to bolt 26 by means of a nut 28 on the shaft 26. The other end of the bar 27 is secured to a bolt 39 by means of a set screw 18, and the bolt 39 is secured to the frame 10 by means of nuts 42. The bolt 26 is secured to the frame 10 by means of nuts 19.

The loom side frames 10 are bound together by suitable girts, one indicated at 31 being shown, and a suitable motor mount is provided having a vertically disposed member 32 which is penetrated by bolts 33 and 34, the bolts penetrating the loom frame 10 and the bolt 34 also penetrating the girt 31 and being secured thereto by any suitable means such as nuts 35 and 36. The portion 32 at its lower end has an outwardly and upwardly projecting portion 37 integral therewith which has on its upper end an integral bearing portion 40 and the portion 32 has an integral well portion 41.

The well portion 41 has fixedly secured therein by means of a pin 44 a shaft 45. There is provided a motor mount plate 46 having downwardly projecting portions 47 and 48 therein which are penetrated by the pin 45. Bearing portions 47 and 48 have projecting outwardly therefrom fins 47a and 48a which are integral with the bearing portions 47 and 48 and the lower surface of the plate 46.

The plate 46 has a plurality of slots 51 in its right-hand portion for receiving bolts 54 which penetrate bosses 55 on a motor housing 56. The plate 46 has projecting upwardly from the left-hand end thereof in Figures 1 and 2, bosses 57 and 58 in which set screws 59 and 60 are mounted for engaging the left-hand set of projections 55 for adjusting the position of the motor before the bolts 54 are tightened to securely fasten the motor housing 56 to the plate 46.

The plate 46 has integral therewith an arm 60 which is additionally supported by means of an upright brace 61 secured to the floor by a bolt 62 and having a slot 63 in its upper end penetrated by a bolt 64 which penetrates a downwardly projecting lip 65 on the bottom edge of the arm 60 to additionally support the arm 60 and the motor mount plate 46.

The arm 60 has a branch L-shaped arm 66 and the free ends of arms 60 and 66 have aligned bores therein in which a bolt 67 is mounted and which bolt is surrounded by a sleeve 68 which is slightly longer than a hub portion 70 of a pulley member which is rotatably mounted on the sleeve 68. A suitable nut 72 is secured on the end of the bolt 67 for securing the same in position and yet the sleeve 68 prevents a binding effect on the hub portion of the double pulley mechanism.

The pulley hub 70 has integral therewith a double V-pulley 74 on which is mounted a plurality of V-belts 75 which are also mounted on a pulley 76 mounted on motor shaft 77 of the motor 56. The pulley hub 70 also has integral therewith a smaller V-pulley 80 which has a plurality of V-belts 81 mounted thereon and which V-belts are also mounted on a pulley 82.

Mounted on the crank shaft 20 is a gear 85 and the crank shaft 20 has a keyway 86 with a key 87 for securing the gear 85 on the crank shaft 20. The gear 85 has integral therewith a sleeve portion 88 which also has a keyway therein in which the key 87 is also disposed. The gear or pinion 85 has an annular clutch portion 84.

The V-pulley 82 has fixedly secured thereto by glueing or otherwise an annular friction band 90, such as cork which is adapted to engage an annular surface 91 on one side of the annular portion 84. The pulley 82 has integral therewith a hub portion 92 having an annular groove therearound. By means of a pressed fit, a sleeve 94 is pressed into the interior bore of hub 92 so as to become integral therewith. Pressed into the groove 93 and having a pressed fit over the periphery of the sleeve 94 is a race ring 95. The hub portion 92 and the sleeve 94 have an angularly disposed bore 97 in which a grease fitting is mounted. The hub portion of gear 85 has a bore 99 therein which coincides with a bore 100 in the hub portion 92 of the pulley 82 in which the grease fitting 98 is disposed.

There is a clearance space 101 between the right-hand end of hub portion 92 and the bottom of the bore in the hub portion of gear 85. A suitable annular groove is provided around the right-hand portion of the hub portion 92 in which a packing ring 103 is mounted. The hub portion 92 has an annular groove 105 cut therein and another race ring 106 is secured by a pressed fit over the left-hand end of sleeve 94. The sleeve 94 on its inside has a groove 107 communicating with the bore 97 and with a radial bore 108 which in turn communicates with the space between the race rings 95 and 106 so as to lubricate the proximate surfaces thereof and also lubricate a plurality of balls 110 disposed between the two race rings 95 and 106.

Loosely mounted on the sleeve portion 88 is an annular member 112 which has a packing ring 113 in engagement with the sleeve portion 88. This member 112 has two outwardly projecting pins 115 and 116 secured therein as by a pressed fit and pin 115 has a bore 117 therein which communicates with a bore 118 whereby a lubricant may be applied to the packing ring 113.

Figures 2, 4:
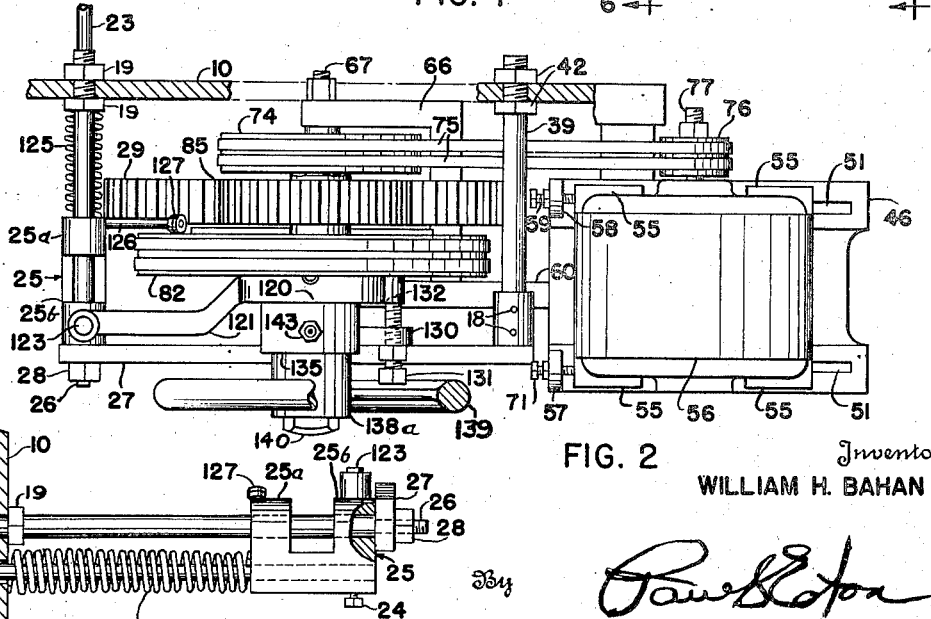
Figure 2 is a top plan view taken substantially along the line 2—2 in Figure 1.
Figure 4 is an elevation taken along the line 4—4 in Figure 1.
Figure 7:
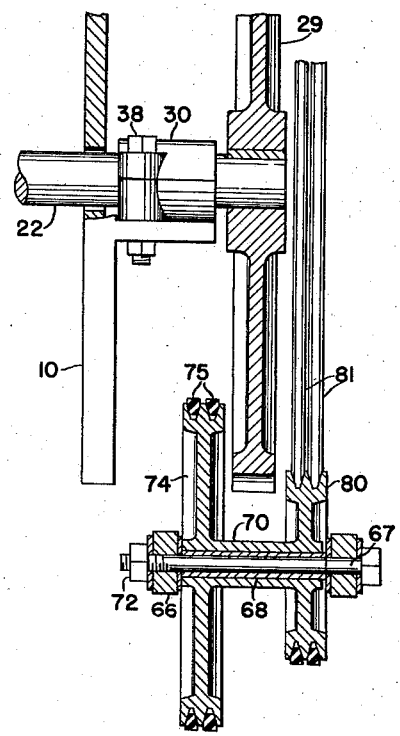
Figure 7 is a vertical sectional view taken along the line 7—7 in Figure 1.
Figure 8:
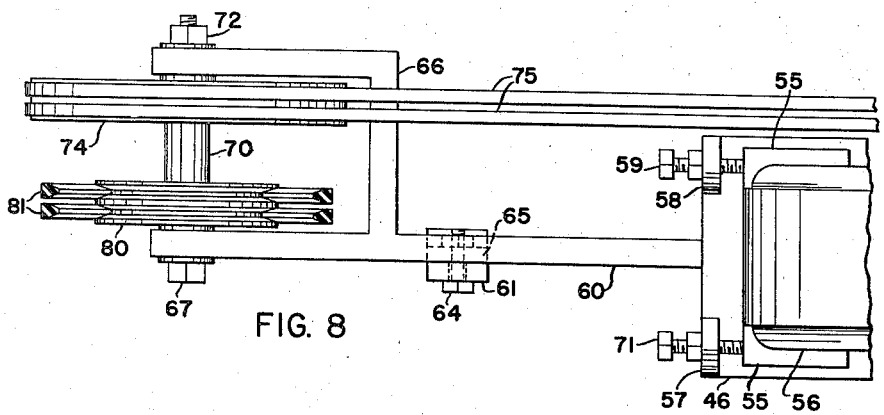
Figure 8 is a sectional plan view taken along the line 8—8 in Figure 1 and omitting the large gear wheel on the cam shaft.

Disposed immediately to the left and surrounding the annular member 112 is an annular member 120 which has an arm 121 projecting to the left therefrom in Figures 1 and 2 which is pivoted to a pin 123 rising upwardly from the forked member 25. Both portions 25a and 25b of forked member 25 are slidably mounted on the shaft 26 and are normally urged to the right in Figure 4 along with the shipper rod 23 at all times by means of a compression spring 125. The portion 25b has rising upwardly therefrom a pin 126 which has a roller 127 on its free end adapted to engage the side of the pulley 82 which is next to the loom frame 10 to move its clutch engaging portion 90 away from the annular face 91 when the shipper lever is moved to knock off position, in the event that the friction portion 90 should not readily separate from the annular portion 91.

Rising upwardly from and secured to the inner side of bar 27 is a plate 130 which has fixedly mounted therein a bearing 135 in which a sleeve 111 is mounted as by a pressed fit, this constituting an outer bearing for the crank shaft 20. The plate 130 has a screw 131 mounted therein whose inner end is adapted to fit into a cavity 132 in annular member 120 and serves as a pivot point for member 120. The left-hand end of bearing 135 and its sleeve 111 has an annular groove cut therein in which race rings 136 and 137 are mounted having balls 138 therebetween and this serves as an anti-friction bearing in case there should be any binding effect of a hub portion 138a of a hand wheel 139 secured on the outer end of the crank shaft 20 by means of a screw 140, and a key 141 disposed in keyway 86. The sleeve 111 and the annular bearing portion 135 have bores 142 and 144, respectively, therein, which coincide to provide a passageway for conducting a lubricant to the crank shaft 20. Groove 144 has a grease fitting 143 therein.

In the drawings and specification there has been set forth a preferred embodiment of the invention and although specific terms are employed, they are used in a generic and descriptive sense only, and not for purposes of limitation, the scope of the invention being defined in the claims.

I claim:

1. In a loom having a side frame in which a crank shaft and a cam shaft are mounted, a motor mount secured to the exterior of the side frame and having an electric motor mounted thereon, said motor mount having a pair of spaced parallel members extending therefrom, a shaft mounted in the free ends of said members and having a hub portion rotatably mounted thereon, said hub portion having integral therewith first and second pulleys, said electric motor having a motor shaft provided with a V-pulley and a V-belt disposed between the first pulley on said hub portion and the pulley on the electric motor, a gear fixedly mounted on the crank shaft, a gear fixedly mounted on the cam shaft and having engagement with the gear on the crank shaft, said gear on the crank shaft having a sleeve integral therewith and projecting laterally therefrom, a V-pulley loosely and slidably mounted on said sleeve and having a clutch face adapted to engage one side of the gear mounted on the crank shaft, a belt connection between the second pulley on the hub portion and the pulley mounted on the sleeve associated with the gear on the crank shaft, an annular member surrounding the crank shaft and having a pair of pins extending therefrom, a second annular member surrounding the crank shaft and mounted in close proximity to the pins extending from said sleeve, a fulcrum in engagement with one side of the second annular member and the second annular member having an arm extending therefrom, said loom having a shipper rod adapted to be actuated by movement of the shipper lever, a pin extending from the shipper rod into close proximity to the side next to the gear of the pulley mounted on the sleeve, a pivoted connection between the free end of said arm and said shipper rod, whereby movement of the shipper rod in one direction will force the friction face of said pulley mounted on the crank shaft into engagement with one side of the gear on the crank shaft and movement in the other direction will cause said pin to move the friction face away from the gear to stop rotation of the crank shaft and the cam shaft.

2. In a loom having a side frame in which a crank shaft and a cam shaft are mounted for rotation, a motor mount secured to the exterior of the frame and having an electric motor mounted thereon, said motor mount having an extension, a shaft mounted in the extension and having a hub portion rotatably mounted thereon, said hub portion having integral therewith a first pulley and a second pulley, said motor having a shaft provided with a pulley, a belt mounted on the motor shaft pulley and the first pulley, a gear fixed on the crank shaft and having a clutch face on the outer surface thereof, a gear fixed on the cam shaft and meshing with the gear on the crank shaft, the gear on the crank shaft having a sleeve integral therewith and projecting outwardly from the side frame, a third pulley loosely and slidably mounted on the sleeve and having a clutch face on one side thereof adapted to engage the clutch face on the gear mounted on the crank shaft, a belt mounted on the said second and third pulleys, a member loosely surrounding the crank shaft, a member pivoted at one end and being disposed adjacent said member surrounding the crank shaft and having a shipper rod, a pivotal connection between the shipper rod and the said arm, whereby upon movement of the shipper rod to operative position the pivoted member will move the two clutch faces into clutching engagement to drive the crank shaft.

3. In a loom having a side frame and a crank shaft and a cam shaft having one end thereof mounted for rotation in the side frame, a gear fixed on the cam shaft, a gear fixed on the crank shaft and meshing with the gear on the cam shaft, a rotatably mounted hub portion having integral therewith a small pulley and a large pulley, an electric motor having a motor shaft with a pulley thereon, a belt mounted on the motor shaft pulley and the small pulley, the gear on the crank shaft having a sleeve integral therewith and a fourth pulley rotatably and slidably mounted thereon, a belt mounted on the large pulley and the fourth pulley, said loom having a shipper rod, a movable member associated with the fourth pulley and having a connection with the shipper rod, the gear on the crank shaft and the fourth pulley having clutch faces on their proximate sides, movement of the shipper rod in one direction serving to move the movable member to force the two clutch faces into engagement with each other to drive the loom.

4. In a loom having a side frame and a crank shaft and a cam shaft mounted for rotation therein, said loom also having a shipper rod, an electric motor mounted adjacent the exterior of the side frame and having a first pulley mounted thereon, a hub portion rotatably supported adjacent the motor and having a second pulley and a third pulley integral therewith, a gear fixed on the crank shaft and having a sleeve extending outwardly therefrom, a fourth pulley rotatably and slidably mounted on the crank shaft, a second gear mounted on the cam shaft and meshing with the first gear, the first gear and the fourth pulley having clutch faces on their proximate surfaces, a belt mounted on the first and second pulleys, a belt mounted on the third and fourth pulleys, an annular member mounted on the crank shaft adjacent the exterior surface of the fourth pulley, a member disposed adjacent the annular member and being pivoted at one end to the loom frame and having an arm extending therefrom and a pivotal connection with the shipper rod, whereby movement of the shipper rod in one direction will move the clutch faces into engagement with each other to drive the crank shaft.

5. In a loom having a side frame and a crank shaft and a cam shaft mounted for rotation therein, an electric motor having a driving pulley, a hub portion rotatably mounted adjacent the motor and having a second pulley and a third pulley integral therewith, a gear fixed on the crank shaft and having a clutch face on its outer side, a fourth pulley slidably and rotatably mounted on the crank shaft and having a clutch face on its inner side for engaging the clutch face on the gear, a gear mounted on the cam shaft and meshing with the gear on the crank shaft, a belt mounted on the driving pulley and second pulley and a belt mounted on the third and fourth pulleys, said loom having a shipper rod and means associated with the fourth pulley and the shipper rod for moving the two clutch faces into clutching relation when the shipper rod is moved to operative position.

6. In a loom having a side frame and a crank shaft and a cam shaft mounted for rotation therein, an electric motor having a driving pulley, a hub portion rotatably mounted adjacent the motor and having a second pulley and a third pulley integral therewith, a gear fixed on the crank shaft and having a clutch face on the outer side thereof, a fourth pulley slidably and rotatably mounted on the crank shaft and having a clutch face on its inner side for engaging the clutch face on the gear, a gear mounted on the cam shaft and meshing with the gear on the crank shaft, a belt mounted on the driving pulley and second pulley and a belt mounted on the third and fourth pulleys, said loom having a shipper rod and means associated with the fourth pulley and the shipper rod for moving the last two clutch faces into clutching relation when the shipper rod is moved to operative position, and means for moving the fourth pulley away from the gear on the crank shaft when the shipper rod is moved to inoperative position.

WILLIAM H. BAHAN.

REFERENCES CITED

The following references are of record in the file of this patent:

UNITED STATES PATENTS

| Number | Name | Date |
|---|---|---|
| 386,506 | Thomas | July 24, 1888 |
| 661,264 | Gordon | Nov. 6, 1900 |

FOREIGN PATENTS

| Number | Country | Date |
|---|---|---|
| 359,840 | Great Britain | Oct. 29, 1931 |